(12) United States Patent
Glimcher et al.

(10) Patent No.: US 10,852,965 B2
(45) Date of Patent: Dec. 1, 2020

(54) WRITE FOLDING MECHANISM USING REUSABLE SHARED STRIPING IN A STORAGE SYSTEM

(71) Applicant: EMC IP Holding Company LLC, Hopkinton, MA (US)

(72) Inventors: Boris Glimcher, Bnei Brak (IL); Zvi Schneider, Tel Aviv (IL); Amitai Alkalay, Kadima (IL); Kirill Shoikhet, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 16/175,057

(22) Filed: Oct. 30, 2018

(65) Prior Publication Data
US 2020/0133526 A1    Apr. 30, 2020

(51) Int. Cl.
G06F 3/00    (2006.01)
G06F 3/06    (2006.01)

(52) U.S. Cl.
CPC ............ *G06F 3/0626* (2013.01); *G06F 3/064* (2013.01); *G06F 3/0689* (2013.01)

(58) Field of Classification Search
CPC .... G06F 3/0619; G06F 3/0689; G06F 3/0665; G06F 3/067
USPC ........................................................ 711/154
See application file for complete search history.

(56) References Cited

U.S. PATENT DOCUMENTS

| | | | | |
|---|---|---|---|---|
| 4,598,357 A | * | 7/1986 | Swenson ............... | G06F 11/073 711/113 |
| 4,920,536 A | * | 4/1990 | Hammond .......... | G06F 11/0751 711/E12.04 |
| 7,437,523 B1 | * | 10/2008 | Ting ........................ | G06F 16/10 711/161 |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Titus Wong
(74) *Attorney, Agent, or Firm* — Ryan, Mason & Lewis, LLP

(57) ABSTRACT

A storage system comprising a plurality of storage devices and an associated storage controller. The plurality of storage devices are configured to store data blocks distributed across the plurality of storage devices in a plurality of data stripes. The plurality of data stripes comprise a first set of data stripes and a second set of data stripes. The storage controller is configured to receive data associated with at least one input-output request and to store the received data sequentially in at least one data stripe of the first set of data stripes. The controller is further configured to determine whether or not an amount of data stored in the first set of data stripes is greater than a threshold amount of data and in response to determining that the amount of data stored in the first set of data stripes is greater than the threshold amount of data, to destage the at least one data stripe of the first set of data stripes to the second set of data stripes.

20 Claims, 10 Drawing Sheets

(56) References Cited

U.S. PATENT DOCUMENTS

| | | | |
|---|---|---|---|
| 7,444,464 | B2 | 10/2008 | Urmston et al. |
| 8,095,726 | B1 | 1/2012 | O'Connell et al. |
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,798,472 | B1* | 10/2017 | Natanzon ............... G06F 3/061 |
| 2005/0141312 | A1* | 6/2005 | Sinclair ............... G06F 11/1658 365/222 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2012/0124294 | A1* | 5/2012 | Atkisson ............... G06F 11/108 711/135 |
| 2013/0325824 | A1 | 12/2013 | Shoens |
| 2014/0181016 | A1 | 6/2014 | Whitehead et al. |
| 2016/0018991 | A1* | 1/2016 | Flynn .................. G06F 3/061 711/154 |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

| D0 | D1 | D2 | D3 | D4 | P | Q |
|----|----|----|----|----|---|---|
| DATA | DATA | DATA | DATA | DATA | ROW PARITY | DIAGONAL PARITY |
| DATA | DATA | DATA | DATA | DATA | ROW PARITY | DIAGONAL PARITY |
| DATA | DATA | DATA | DATA | DATA | ROW PARITY | DIAGONAL PARITY |
| DATA | DATA | DATA | DATA | DATA | ROW PARITY | DIAGONAL PARITY |
| | | | | | | DIAGONAL PARITY |

FIG. 4

WRITE FOLDING MECHANISM USING REUSABLE SHARED STRIPING IN A STORAGE SYSTEM

FIELD

The field relates generally to information processing systems, and more particularly to storage in information processing systems.

BACKGROUND

In many information processing systems, storage systems are key elements. Storage systems, such as block based storage systems, are designed to store and retrieve large amounts of data. To store a block of data, a host device typically provides a data block address and data block content to a storage system. The host device also provides the data block address to the storage system to retrieve the data block content stored in the storage system at a physical address. Some storage solutions rely on address-based mapping of data, as well as address-based functionality of a storage system's internal algorithms. For example, computing applications typically rely on address-based mapping and identification of data that is stored and retrieved. However, another solution in which data, internally within a storage system, is mapped and managed based on its content instead of its address can provide various substantial advantages. For example, such a content-based storage solution improves storage capacity efficiency since any duplicate block data will only occupy actual capacity of a single instance of that block. As another example, the content-based storage solution can improve performance since duplicate block writes do not need to be executed internally in the storage system. Content-based storage solutions, however, face various challenges.

SUMMARY

Disclosed embodiments provide techniques for enhanced write folding in storage systems that implement data striping across a plurality of storage devices by using reusable shared data stripes, illustratively described as RUSH data stripes herein in some embodiments, which provide benefits including increased write folding window size, improved reliability, and metadata awareness.

In some embodiments, a storage system implementing data striping comprises a plurality of storage devices and an associated storage controller. The plurality of storage devices are configured to store data blocks. The data blocks are distributed across the plurality of storage devices in a plurality of data stripes. The plurality of data stripes comprise a first set of data stripes and a second set of data stripes. The first set of data stripes are configured to support write folding of data to be stored in the second set of data stripes. The storage controller is configured to receive data associated with at least one IO request and to store the received data sequentially in at least one data stripe of the first set of data stripes. The controller is further configured to determine whether or not an amount of data stored in the first set of data stripes is greater than a threshold amount of data, and in response to determining that the amount of data stored in the first set of data stripes is greater than the threshold amount of data, to destage the at least one data stripe of the first set of data stripes to the second set of data stripes.

These and other illustrative embodiments include, without limitation, apparatus, systems, methods and processor-readable storage media.

BRIEF DESCRIPTION OF THE DRAWINGS

FIG. 4 is a table showing distribution of data blocks in the FIG. 3 RAID 6 array.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
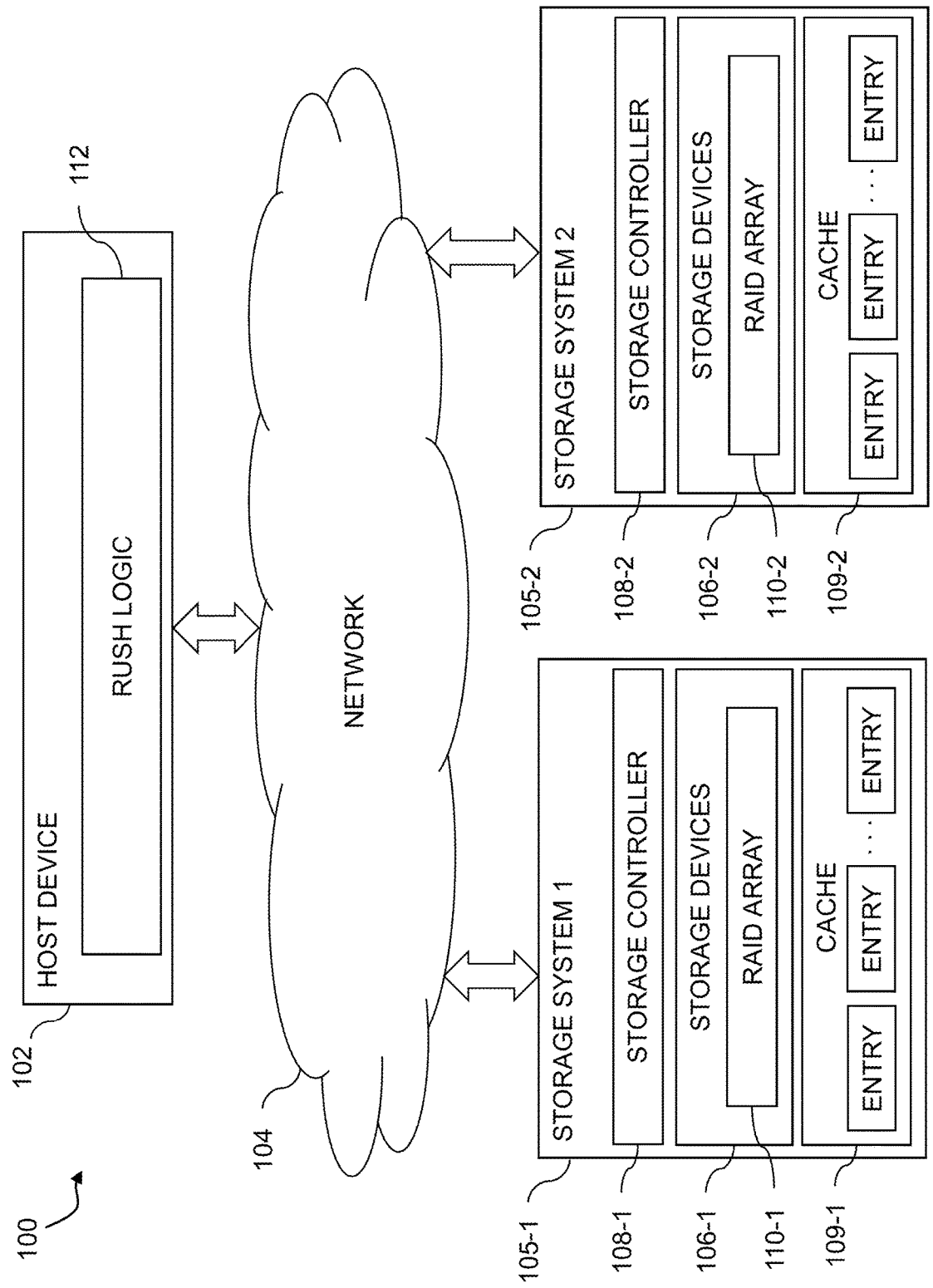
FIG. 1 is a block diagram of one example of an information processing system within which one or more illustrative embodiments are implemented.

FIG. 1 shows an information processing system 100 configured in accordance with an illustrative embodiment. The information processing system 100 comprises a host device 102, which may comprise one of a plurality of host devices of a computer system. The host device 102 communicates over a network 104 with first and second storage systems 105-1 and 105-2, also denoted as Storage System 1 and Storage System 2, respectively. The storage systems 105-1 and 105-2 are collectively referred to herein as storage systems 105. The host device 102 and storage systems 105 may be part of an enterprise computing and storage system, a cloud-based system or another type of system.

The host device 102 and storage systems 105 illustratively comprise respective processing devices of one or more processing platforms. For example, the host device 102 and the storage systems 105 can each comprise one or more processing devices each having a processor and a memory, possibly implementing virtual machines and/or containers, although numerous other configurations are possible.

The host device 102 and the storage systems 105 can additionally or alternatively be part of cloud infrastructure such as an Amazon Web Services (AWS) system. Other examples of cloud-based systems that can be used to provide one or more of host device 102 and storage systems 105 include Google Cloud Platform (GCP) and Microsoft Azure.

The host device 102 is configured to write data to and read data from the storage systems 105. The host device 102 and the storage systems 105 may be implemented on a common processing platform, or on separate processing platforms. A wide variety of other types of host devices can be used in other embodiments.

The host device 102 in some embodiments illustratively provides compute services such as execution of one or more applications on behalf of each of one or more users associated with the host device 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage systems 105 are accessible to the host device 102 over the network 104. The storage system 105-1 comprises a plurality of storage devices 106-1, an associated storage controller 108-1, and an associated cache 109-1. Similarly, the storage system 105-2 comprises a plurality of storage devices 106-2, an associated storage controller 108-2, and an associated cache 109-2. The storage devices 106-1 and 106-2 are collectively referred to herein as storage devices 106. The storage controllers 108-1 and 108-2 are collectively referred to as storage controllers 108. The caches 109-1 and 109-2 are collectively referred to as cache 109.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, at least one of the storage systems 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement one or both of storage systems 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In the FIG. 1 embodiment, the storage devices 106 implement one or more RAID arrays, denoted as RAID array 110-1 for storage devices 106-1 of storage system 105-1 and RAID array 110-2 for storage devices 106-2 of storage system 105-2. The RAID arrays 110-1 and 110-2 may collectively form a single RAID array 110, or may represent distinct RAID arrays. The RAID arrays 110 are assumed to store data in stripes across a plurality of SSDs provided by the storage devices 106. The RAID array 110 is an example of what is more generally referred to herein as data striping across a plurality of storage devices in a storage system.

The caches 109-1 and 109-2 of storage systems 105-1 and 105-2 in the FIG. 1 embodiment include cache entries which store incoming IO request data for later destaging to storage devices 106. Cache 109 may illustratively comprise volatile memory such as, e.g., random access memory (RAM), dynamic random-access memory (DRAM), static random-access memory (SRAM), or any other kind of volatile memory. In some embodiments, cache 109 may additionally or alternatively comprise any non-volatile memory as described above with respect to storage devices 106. In some embodiments, cache 109 may support a variety of operations or functions of storage system 105 including, for example, write cache, read cache, temporary metadata storage, or other similar operations. While illustrated as a separate component of storage system 105, in some embodiments, cache 109 may be included as a component of storage controller 108. In some embodiments, the cache 109 of each of storage systems 105-1 and 105-2 may operate together as a single cache 109 where the components of a given storage system 105 may access any portion of the cache 109 including those portions included as components of other storage systems 105.

The host device 102 in the FIG. 1 embodiment includes RUSH logic 112 which provides logic and functionality for write folding using RUSH data stripes of the storage systems 105. Write folding using RUSH logic 112 will be described in further detail below. The host device 102 should also be understood to include additional modules and other components typically found in conventional implementations of computers, servers or other host devices, although such additional modules and other components are omitted from the figure for clarity and simplicity of illustration.

The host device 102 and storage systems 105 in the FIG. 1 embodiment are assumed to be implemented using at least one processing platform each comprising one or more processing devices each having a processor coupled to a memory. Such processing devices can illustratively include particular arrangements of compute, storage and network resources.

The host device 102 and the storage systems 105 may be implemented on respective distinct processing platforms, although numerous other arrangements are possible. For example, in some embodiments at least portions of the host device 102 and one or both of the storage systems 105 are implemented on the same processing platform. The storage systems 105 can therefore be implemented at least in part within at least one processing platform that implements at least a portion of the host device 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host device 102 and storage systems 105 to reside in different data centers. Numerous other distributed implementations of one or both of the host device 102 and the storage systems 105 are possible. Accordingly, the storage systems 105 can also be implemented in a distributed manner across multiple data centers.

Additional examples of processing platforms utilized to implement host devices and/or storage systems in illustrative embodiments will be described in more detail below in conjunction with FIGS. 8-10.

It is to be appreciated that these and other features of illustrative embodiments are presented by way of example only, and should not be construed as limiting in any way.

Accordingly, different numbers, types and arrangements of system components such as host device 102, network 104, storage systems 105, storage devices 106, storage controllers 108, cache 109, and RAID arrays 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing functionality for write folding using RUSH data stripes will be described below.

Figure 2:
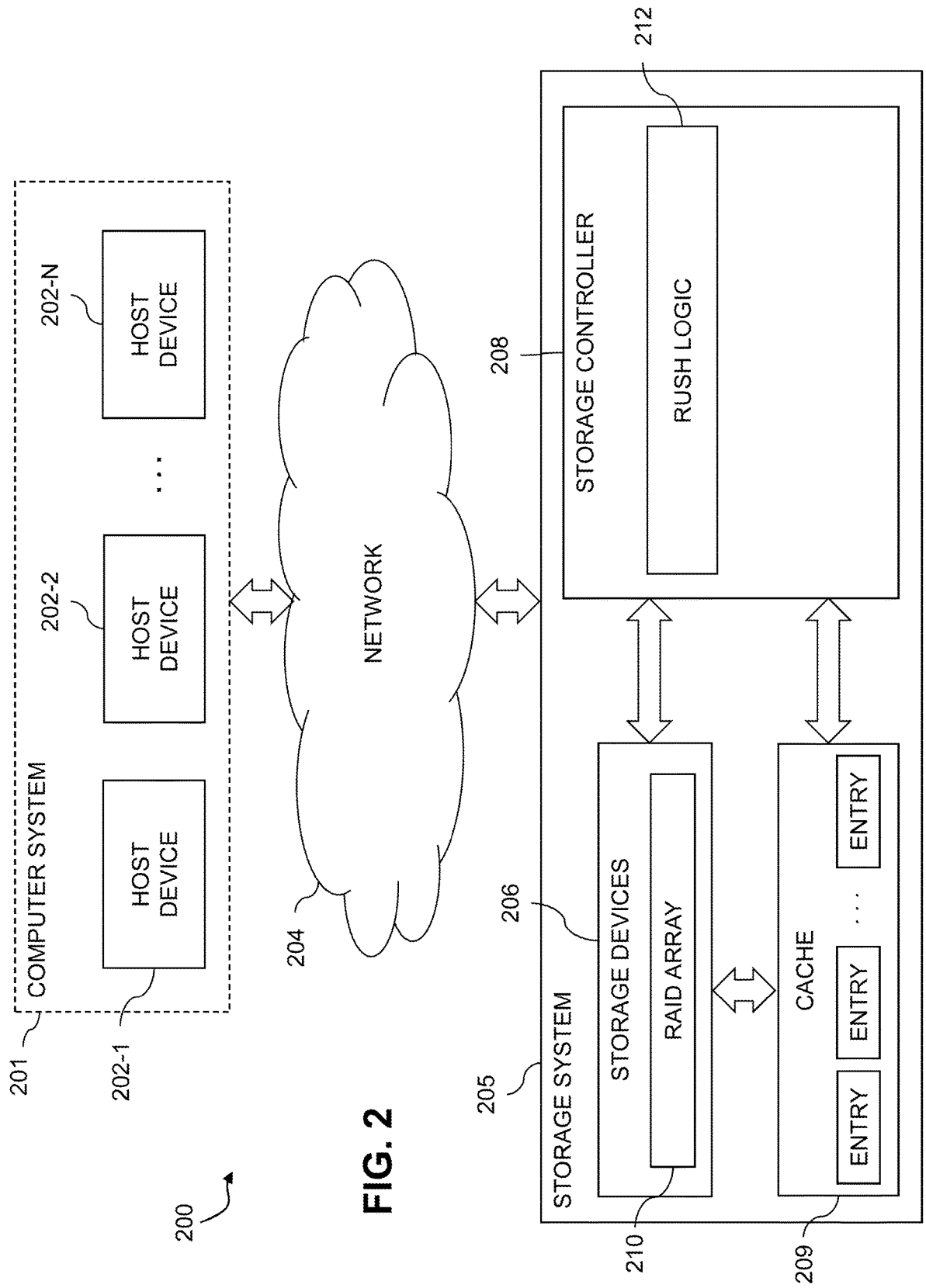
FIG. 2 is a block diagram of another example of an information processing system within which one or more illustrative embodiments are implemented.

FIG. 2 shows an information processing system 200 configured in accordance with another illustrative embodiment. The information processing system 200 comprises a computer system 201 that includes host devices 202-1, 202-2, ... 202-N collectively referred to as host devices 202. The host devices 202 communicate over a network 204 with a storage system 205. The computer system 201 is assumed to comprise an enterprise computer system, cloud-based computer system or other arrangement of multiple compute nodes associated with respective users. The host devices 202 of the computer system 201 in some embodiments illustratively provide compute services such as execution of one or more applications on behalf of each of one or more users associated with respective ones of the host devices 202.

Similar to the storage systems 105 of system 100, the storage system 205 comprises storage devices 206, storage controller 208, cache 209, and RAID array 210. However, in this embodiment, the functionality for write folding using RUSH data stripes of RAID array 210 is implemented in the storage system 205, rather than in one of the host devices 202. Accordingly, the storage controller 208 in this embodiment comprises RUSH logic 212, which is configured to operate in substantially the same manner as that described above for RUSH logic 112 of the host device 102 in the system 100. In some embodiments, functionality for write folding using RUSH data stripes can be implemented partially in a host device and partially in the storage system. Accordingly, illustrative embodiments are not limited to arrangements in which all such functionality is implemented in a host device or a storage system, and therefore encompass various hybrid arrangements in which the functionality is distributed over one or more host devices and one or more storage systems, each comprising one or more processing devices.

Illustrative data striping operations with associated write folding using RUSH data stripes in accordance with RAID based techniques will now be described in further detail in the context of the information processing systems 100 and 200. However, it is to be understood that data striping operations with associated write folding using RUSH data stripes are more generally applicable to other types of information processing systems. At least some of the write folding steps are illustratively performed under the control of the RUSH logic 112 in host device 102 of system 100 or in RUSH logic 212 in storage controller 208 of system 200.

Data striping in some embodiments is implemented utilizing RAID, such as via RAID arrays 110 on storage systems 105. In such embodiments, the number of data disks in the RAID storage system may comprise a prime number k, and a column of the RAID storage system comprises k−1 blocks. The storage devices of the RAID storage system may be SSDs. The RAID storage system may implement RAID 6 with the number of data disks being k and the number of parity disks being n, where n is greater than one (e.g., where n=2). In some embodiments, the stripe column size is selected as a multiple of a designated block size. The multiple may be a prime number P minus 1. The prime number P may be the same as or different than the prime numbers selected for different ones of the stripes.

In some cases, the prime number selected for a particular stripe may be greater than a number of the plurality of storage devices in the storage system that store data blocks for that stripe. To handle such situations, the parity blocks for the stripe may be computed by assuming or setting a set of virtual storage devices with pages storing designated predetermined values (e.g., zero pages). The particular number of virtual storage devices in the set may be equal to the difference between the prime number selected for that stripe and the number of storage devices in the storage system which store data blocks for that stripe.

The term RAID, as used herein, is an umbrella term for computer data storage schemes that can divide and replicate data among multiple physical disk drives. The terms disks and drives will be used interchangeably henceforth. The physical disks are said to be in a RAID array, which is accessed by an operating system as one single disk. The different schemes or architectures are named by the word RAID followed by a number (e.g., RAID 0, RAID 1, etc.). Each scheme provides a different balance between the goals of increasing data reliability and increasing input/output performance.

The RAID 6 scheme was developed to provide functionality for recovering from multiple disk failure (e.g., similar to RAID 1.3) with high utilization rates (e.g., comparable to RAID 4 and 5) that avoids system bottlenecks. RAID 6 uses an N+2 parity scheme, which allows failure of two disks, where N is the number of disks in the array. RAID 6 defines block-level striping with double distributed parity and provides fault tolerance of two drive failures, so that the array continues to operate with up to two failed drives, irrespective of which two drives fail.

There are various implementations of RAID 6, which may use varying coding schemes. As the term is used herein, RAID 6 is defined as any N+2 coding scheme which tolerates double disk failure, while user data is kept in the clear. This additional requirement assures that user reads are not affected by the RAID scheme under normal system operation. Examples of RAID 6 schemes include those that utilize the Reed Solomon error correction code and those that utilize parity bits, such as those wherein Ndata disks are supported by two redundancy disks each holding a different parity bit. It should be noted that if all parity bits are on the same two disks, then the performance may be subject to bottlenecks. This can be solved by use of distributed parity stripes over N+2 disks similar to that specified in RAID 5. Examples of coding schemes based on parity calculations of rows and diagonals in a matrix of blocks include Even/Odd and Row Diagonal Parity (RDP). Both of these schemes utilize a first parity disk "P" that holds the parities of rows of blocks as well as a second parity disk "Q" that contains blocks that hold the parity of diagonals of data blocks. In both schemes, it is advantageous to work with a block size that is smaller than the native page size. For example, the native page size may be 8 kilobytes (KB), while the block size is smaller but evenly divisible into 8 KB, e.g., 0.5 KB, 1 KB, 2 KB, 4 KB. In an example where the native page size is 8 KB and the block size is 2 KB, each stripe thus may contain four rows, and thus the four blocks present on each disk form a single native page. However, a stripe can also be defined by multiple rows of blocks distributed across the storage devices of the RAID array. It is assumed that pages are read and written using a single disk operation.

Figure 3:
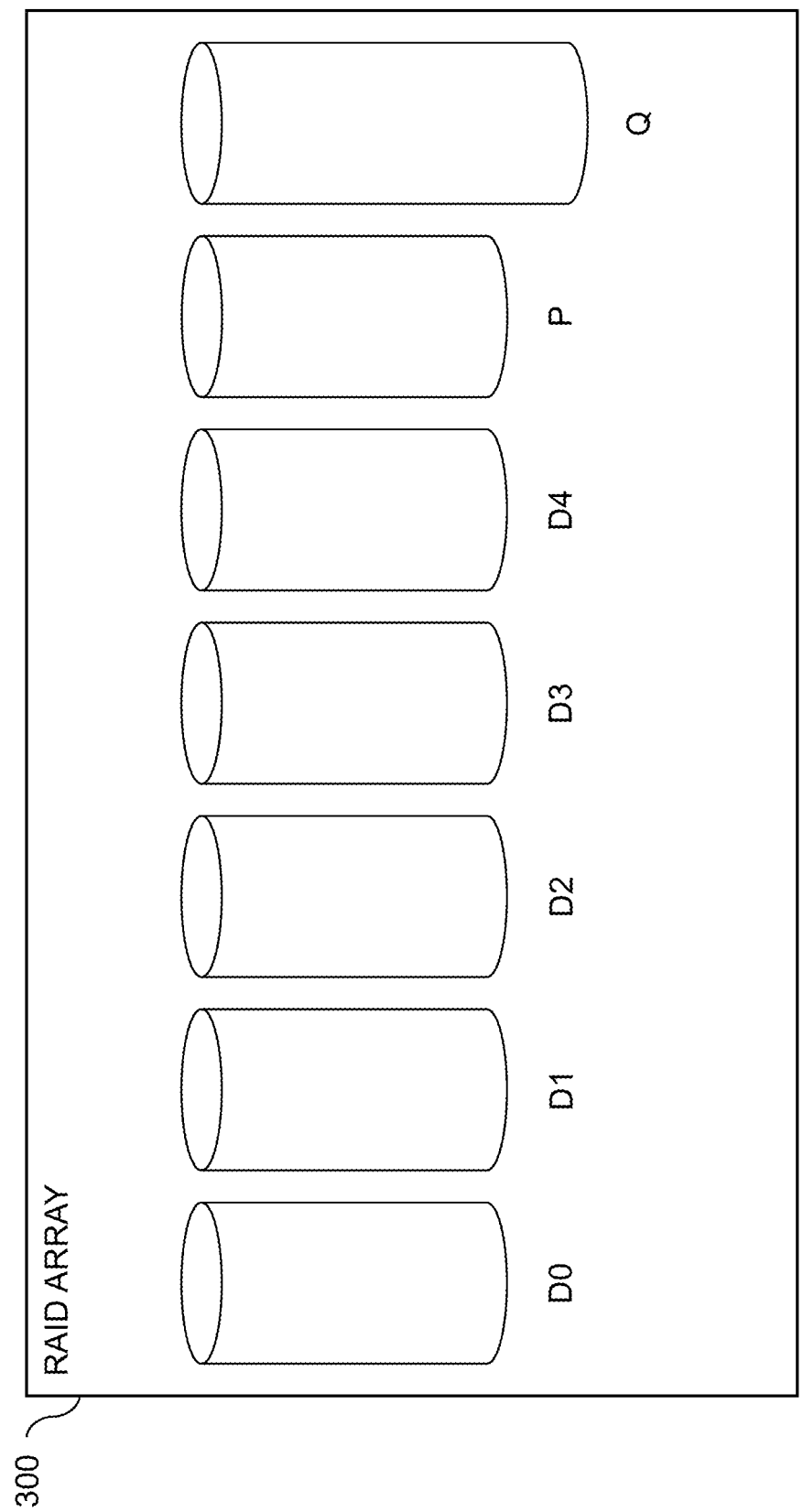
FIG. 3 is a block diagram illustrating an example of a Redundant Array of Independent Disks (RAID) 6 array for implementation in the FIG. 1 system or the FIG. 2 system.

FIG. 3 shows a RAID array 300, which in this example includes five data disks denoted D0 through D4. A storage controller (e.g., such as storage controllers 108 or storage controller 208) is configured for writing initial data into the array 300, and for updating existing data in the array 300. The storage controller further provides functionality for recovering data after single or double disk failure.

Each of the disks in the array 300 stores a column of data blocks. The same data block in successive disks forms a row, which is to say the rows cross the disks. The data storage blocks are stored alongside parity data blocks in parity disks denoted P and Q, and the numbers of data blocks in the different columns or disks may be different. Row parity blocks are placed in a row parity column in disk P, and the diagonal parity data is placed in diagonal parity blocks in disk Q.

In the case of five data columns and four data rows, the number of diagonals is one greater than the number of rows. Thus, the diagonal parity column in disk Q includes one more block than the other columns for disks D0 through D4 and the row parity disk P. This is illustrated in FIG. 3 as Q is "taller" than D0 through D4 and P.

The number of data columns is a prime number, and the number of rows is one less than that prime number (e.g., in the FIG. 3 example the prime number is 5, which corresponds to the five data disks D0 through D4). It should be noted that, in practice, the various columns are distributed over the available physical disks to avoid system bottlenecks.

FIG. 4 shows a table 400 illustrating one example distribution of data blocks in the RAID array 300. In this example, there are k data disks, where k=5 is a prime number, and there are five data columns corresponding to disks D0 through D4. There are four rows (e.g., k−1). The P column includes the same four rows as the data columns D0 through D4, but the Q column has an extra row.

In one example, each stripe is considered to contain k (where k must be prime) data columns D0 through D4, and two parity columns P and Q. The stripe is composed of a quasi-matrix of blocks, which contain k−1 rows. Column P contains k−1 blocks, each providing the parity of the k data disk blocks in its row. The k by k−1 matrix made up of the blocks in the data columns includes k diagonals each of size k−1. Column Q, in contrast with the rest of the columns, contains k blocks and not k−1. Each of the k blocks in disk Q holds the parity of one of the diagonals. It should be noted that the ordering of blocks within each column may be arbitrary. Furthermore, the extra block in column Q may be placed in a data column which does not contain a data block in the diagonal of which this block is the parity. Also, some of the rows may be blank.

It should be appreciated that there are various other ways to distribute data blocks in an array such as RAID array 300. For example, in some cases it may be desired to provide more than one row parity column, which results in higher capacity overhead but which allows for a faster rebuild after a single disk failure.

Additional details regarding the above-described techniques for storing data in RAID arrays are disclosed in U.S. Pat. No. 9,552,258, entitled "Method and System for Storing Data in RAID Memory Devices," which is incorporated by reference herein.

Some modern storage systems leverage flash drives as storage devices to provide fast, reliable, de-duplicated, compressible, and in-place-update data storage. In such storage systems, cell wear and heavy load on the backend flash drives may become a limitation as the data storage locations on the flash drives may only execute a limited number of write operations before failure. In some cases, for example, a host device may write and re-write data to the same data storage location multiple times within a short period of time, e.g., due to database updates and logs, which may cause excessive cell wear to those data storage locations. This is generally called write folding. In these cases, writing data to the drives may be avoided to improve wear leveling of the drives. For example, when the storage system knows that there is a large possibility for the data to be overridden within a short period of time there is no need to store it safely for a long term.

In illustrative embodiments, a write folding mechanism is implemented by RUSH logic 112 using RUSH data stripes on the RAID array that reduces the number of unnecessary operations that write to the same data storage location in a short period of time. The RUSH logic 112 allows a larger number of writes to be persistently cached for a period of time longer than that which is available in cache 109 such that the number of writes to the final data storage locations of the backend flash drives are minimized, thereby reducing cell wear.

In a content aware storage system over a cluster of distributed servers, for example, data is typically written once to the drives and not moved again. This ensures small write amplification to the drives which improves bandwidth and reduces cell wear, but such storage systems rarely address write folding which may be used to avoid unnecessary disk input-output operations when a host re-writes the same address range. Since write folding allows writes and re-writes to be cached, the number of writes that are actually sent to the backend flash drives may be minimized to further reduce cell wear.

Sometimes the window of re-write is small enough that different caching mechanisms such as, e.g., cache 109, may be used to delay writes to the drives by storing writes in the cache for some small period of time, but there is often not enough storage capacity in such caching mechanisms. Since host-written data needs to be stored in non-volatile memory in the event that the system fails, cache based on RAM is typically not capable of providing write folding in sufficient size. For example, in some embodiments it may be important to perform write folding on a significantly sized window for the write folding to be effective, e.g., a window that may include minutes worth of writes.

By using persistent memory on the RAID array, the disclosed RUSH mechanism protects pending writes in case of power failure while providing protection for two drive failures in highly available systems.

Figure 5:
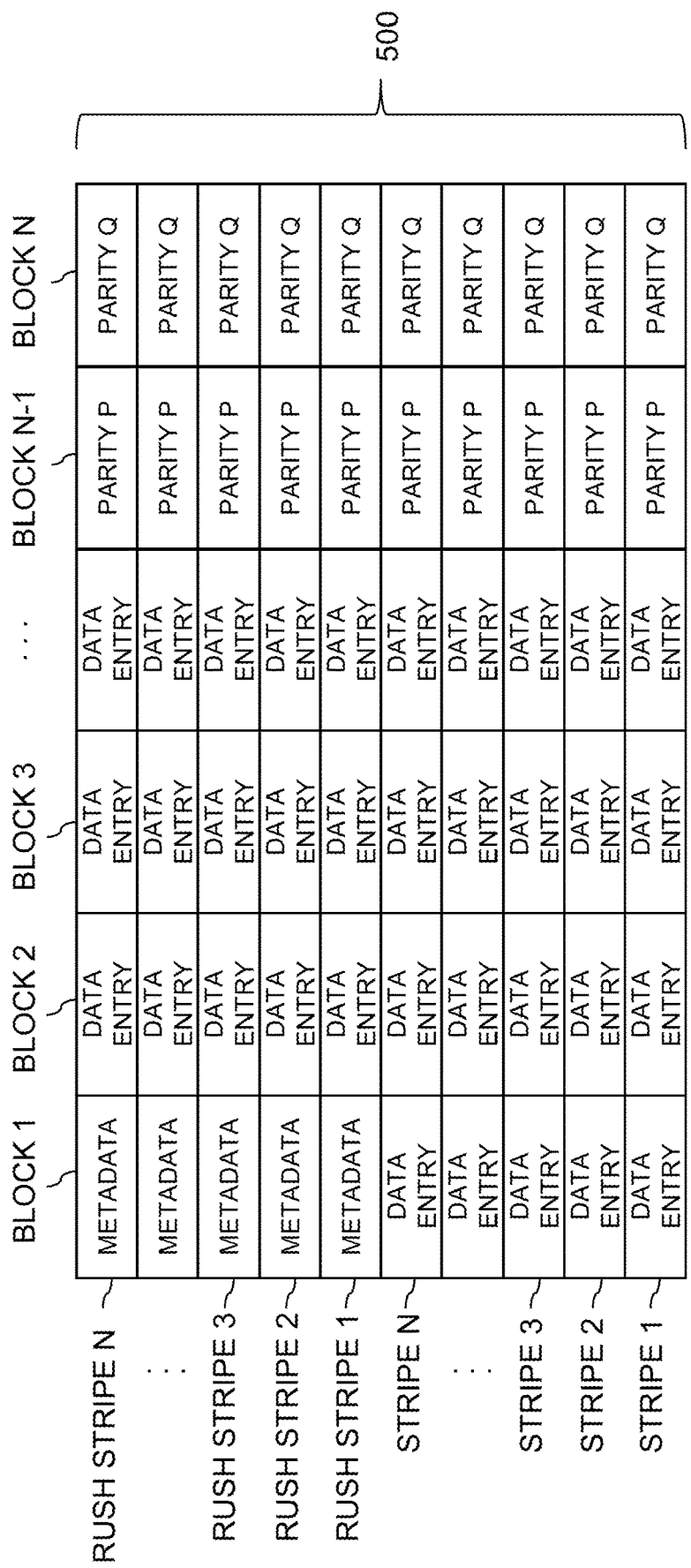
FIG. 5 is a table illustrating an example of a RAID 6 array including RUSH data stripes in an illustrative embodiment.

With reference now to FIG. 5, an example structure of a RAID array, e.g., a RAID 6 array, including a plurality of data stripes 500 is illustrated. In some embodiments, for example, a portion of the data stripes of a RAID array, e.g., RAID arrays 110 or RAID array 210, may be allocated as RUSH data stripes 1 through N. The RUSH data stripes are a set of additional data stripes that do not belong to the usable data range for storing application data. For example, the usable data range may comprise data stripes 1 through N with the RUSH data stripes 1 through N being separate from the data stripes 1 through N. The RUSH data stripes are used as a temporary holding area for data to implement a large write folding window in persistent memory.

In some embodiments, for example, an area of 500 GB may be allocated from the plurality of data stripes 500 of the RAID array for use as RUSH data stripes. Depending on the writing speed and patterns of the storage system, such an allocated area may hold, for example, 10 minutes of user data to allow for better write folding. In some embodiments, any other size or number of data stripes of the RAID array may be allocated for the RUSH data stripes. In some embodiments, for example, the size or number of data stripes of the RAID array that are allocated to the RUSH data stripes may be determined based at least in part on a target amount of user data to be write folded, a target amount of time of user data to be write folded, or other similar metrics.

The RUSH logic 112 and 212 is configured to store and aggregate incoming write data together as data entries in data blocks of the RUSH data stripes. In some embodiments, each RUSH data stripe may also store metadata corresponding to any data entries stored in that RUSH data stripe. The storage of the metadata along with the incoming write data allows for the RUSH data stripes to be self-describing which assists in the reconstruction of the metadata from the RUSH data stripe itself in case of power loss or other failure in the RAID array. As the RUSH data stripes are part of the RAID array, both the data entries and metadata are protected by the RAID mechanism.

In some embodiments, for example, the RUSH data stripes may be an example of a log-structured RAID array, where, for example, data entries and metadata are kept together and writing is performed on an empty RUSH data stripe in a sequential manner. In some embodiments, background garbage collection routines may be responsible for preparing new clean RUSH data stripes for use by the storage controller. The sequential writing used for the RUSH data stripes is in contrast to the in-place-update writing in typical RAID array data stripes where the holes in already existing stripes are filled with the new data. For example, by sequentially writing to the RUSH data stripes, cell wear may be reduced in the RUSH data stripes as each block is written in order and each block in the RUSH data stripe will be written to before any blocks receive further writes.

In some embodiments, with reference again to FIG. 5, an example structure that may be implemented for RUSH data stripes, e.g., RUSH stripes 1 through N, is illustrated.

For example, each RUSH data stripe may comprise one or more rows of data blocks, e.g., 8 rows or any other number of rows optimized for the metadata page size. In some embodiments, each row may span all drives in the RAID array, e.g., twenty-five drives plus the parity drives P and Q. In some embodiments, each row or one or more rows may span fewer than all the drives in the RAID array.

In some embodiments, each drive may include 4 KB data for each row of a RUSH data stripe, for example, optimized for a native drive block size of the RAID array. In some embodiments, the data included on each drive for each row of the RUSH data stripe may be greater or less than 4 KB.

In some embodiments, the first 4 KB, e.g., first block, of the RUSH data stripe may comprise a metadata page for that RUSH data stripe. In some embodiments, any other block or amount of data of the RUSH data stripe may comprise the metadata page. For example, in some embodiments, the last 4k of the RUSH data stripe may include the metadata page.

In some embodiments, for example, the size of each RUSH data stripe may be defined as 8 rows*25 drives*4 KB=800 KB of data (not including parity P and Q which comprise an additional 4 KB each spanning an additional 2 drives). While described as having 8 rows, 25 drives, and 4 KB per data block, any other number of rows, drives, and data block sizes may be used.

In some embodiments, the storage system may have a native block size, for example, 8 KB, such that writing to the RUSH data stripes on uncompressed blocks may lead to 800 KB/8 KB=100 uncompressed data entries. In some embodiments, data compression may be implemented for the RUSH data stripes. For example, in some embodiments, a compression ratio of 1.28:1 may be used such that 128 entries may be supported inside a single example RUSH data stripe. In some embodiments, for example, the data to be stored in the RUSH data stripes may be compressed in order to improve data reduction.

In some embodiments, the compression may be applied in blocks of a sector, e.g., 512B, granularity. For example, each storage system may have a native block size, e.g., 8 KB that may be compressed to 1, 2, 3, 4, 5, 6, 7, 8, or any other number of sectors of 512B. In some embodiments, a bitmap may be stored in the metadata which comprises information on the compression used for the data entries found in each data block in the RAID data stripe. In some embodiments, one or more of the individual data entries stored in the RUSH data stripes may have different levels of compression.

In some embodiments, each RUSH data stripe may include a metadata page, for example, having a size of 4 KB or the size of a data block of the RUSH data stripe. The metadata page is saved as part of the RUSH data stripe such that each RUSH data stripe is self-describing. In some embodiments, for example, the metadata page for a given RUSH data stripe may include a generic header for the entire RUSH data stripe. In some embodiments, the metadata page for the given RUSH data stripe may include metadata for each entry stored in the RUSH data stripe. For example, the metadata may include a signature such as, e.g., SHA-1, a reference count for each block which may be used for the write folding operations, and a packing bitmap, e.g., to support different compression ratios for different entries if compression is implemented.

In some embodiments, the maximal amount of entries that may be supported and stored within a RUSH data stripe may be determined according to the best compression granularity that may be achieved. In some embodiments, for example, the sector size of 512B may be the maximal amount of entries that may be supported and stored within a RUSH data stripe. In some embodiments, a target amount of compression to be used for entries in a RUSH data stripe may be determined based on a tradeoff between the resource cost to compress and decompress the data and the target speed for processing entries in the RUSH data stripes. For example, in some embodiments light compression may be used to ensure faster processing of the RUSH data stripes.

In some embodiments, non-volatile memory express (NVMe) drive technology may be used to improve performance when writing to RUSH data stripes. For example, the streams/sets feature in NVMe drives may be used to improve performance when writing to RUSH stripes. Since RUSH data stripes are allocated as a separate region from the rest of the data stripes spanning all the drives in the RAID array, a separate NVMe set/stream can be defined for each drive for the RUSH data stripes. In addition, since RUSH data stripes are written sequentially, the write performance and wear leveling are superior as compared to the rest of the data stripes, where, for example, a random pattern for data storage is typically used. By optimizing the RUSH data stripes using the NVMe technology, overhead associated with the introduction of RUSH data stripes into the storage system may be reduced.

Figure 6:
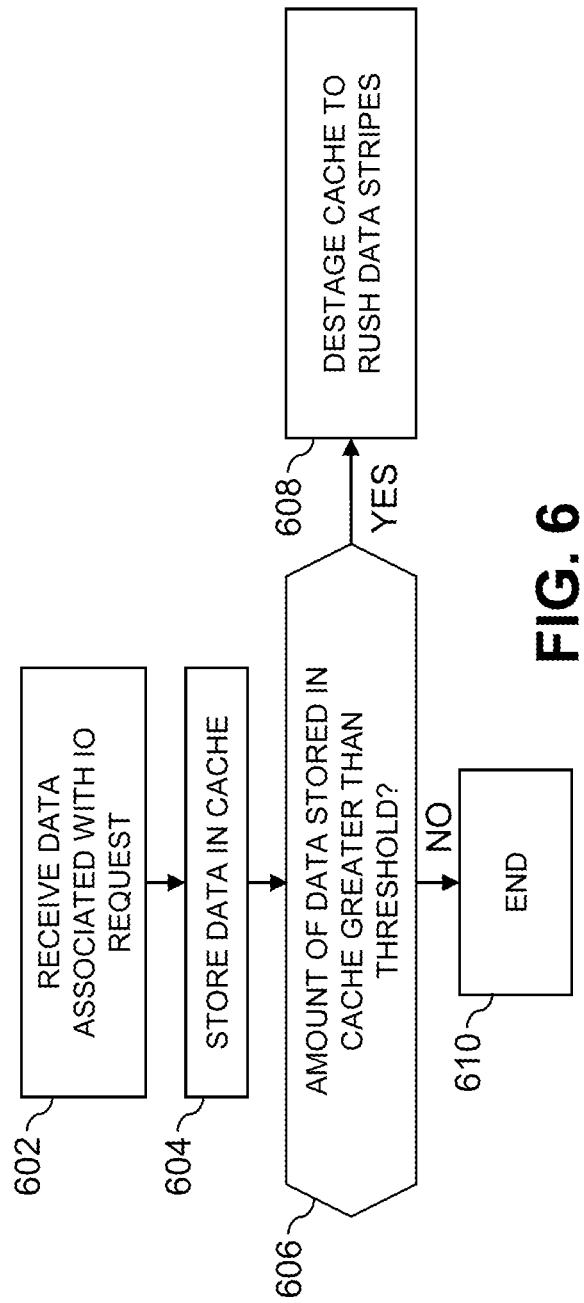
FIG. 6 is a flow diagram illustrating part of a methodology for write folding using RUSH data stripes in an illustrative embodiment.
Figure 7:
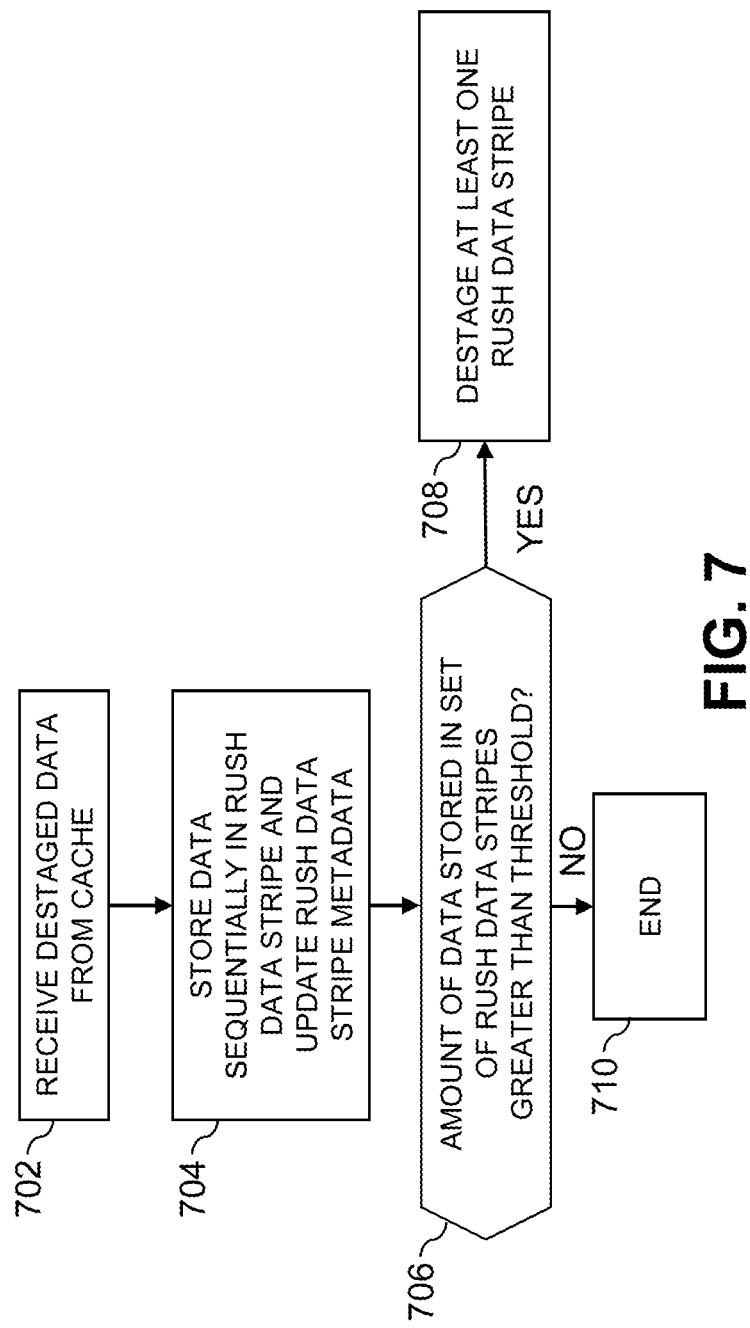
FIG. 7 is a flow diagram illustrating part of a methodology for write folding using RUSH data stripes in an illustrative embodiment.

FIGS. 6 and 7 are flow diagrams illustrating a methodology for window folding using RUSH data stripes based on an execution of RUSH logic 112/212 by a storage controller 108/208 in an illustrative embodiment.

With reference to FIG. 6, the process of receiving an IO request is described.

At 602, data associated with an incoming IO request is received, for example, by storage controller 108/208.

At 604, the received data is stored in the cache 109/209.

At 606, the storage controller 108/208 determines whether the data stored in the cache 109/209 is greater than a predetermined threshold, e.g., ¾ of the capacity of the cache 109/209 or any other amount.

At 608, if the amount of data stored in the cache 109/209 is greater than the predetermined threshold, one or more background destager threads may perform destaging of the cache. In a typical storage system, the cache is destaged directly into the target data locations in the RAID array. In the illustrative embodiment, the cache is instead destaged by the one or more destager threads into one or more RUSH data stripes. For example, the cache may be destaged to the next empty RUSH data stripe with the data being store sequentially and the metadata page of the next empty RUSH data stripe being updated. If on the other hand, the amount of data stored in the cache is not greater than the predetermined threshold, the background destager threads may wait and the process ends at 610. In some embodiments, cache 109/209 may serve as an initial write folding mechanism where, for example, any re-writes to the same address range that are received within the limited time frame/amount of data that the cache can hold before destaging may invalidate the earlier writes where such invalidated writes may not be destaged to the RUSH data stripes.

With reference now to FIG. 7, a process flow for the RUSH data stripes will now be described.

At 702, the destaged data from the cache 109/209 may be received by storage controller 108/208 using RUSH logic 112/212.

At 704, the destaged data is stored sequentially in the RUSH data stripes by RUSH logic 112/212 and the metadata for the RUSH data stripes are updated based at least in part on the destaged data. In some embodiments, the destaged data may be compressed as described above before storing in the RUSH data stripes. In some embodiments, P and Q parity values may be calculated and updated in the RUSH data stripes based on the destaged data.

At 706, RUSH logic 112/212 determines whether or not the amount of data stored in the set of RUSH data stripes is greater than a predetermined threshold. For example, the predetermined threshold may be ¾ of the entire set of RUSH data stripes or any other threshold. In some embodiments, the predetermine threshold may be set such that at least one RUSH data stripe fills up before the predetermined threshold is met.

At 708, if the amount of data is greater than the predetermined threshold, one or more of the RUSH data stripes is destaged to the regular data stripes of the RAID array, e.g., stripes 1 through N, e.g., by one or more background destager threads. In some embodiments, for example, the oldest RUSH data stripe may be destaged first. In some embodiments, only one of the RUSH data stripes may be destaged each time the amount of data is greater than the predetermined threshold. As with the cache destaging, any re-writes to the same address range that are received within the time frame/amount of data that the RUSH data stripes can hold before destaging may invalidate the earlier writes to the same address range where such invalidated writes may not be destaged to data stripes 1 through N. In this manner, write folding may be performed on a longer time window than that available through cache 109/209, thereby reducing unnecessary writes to the data stripes 1 through N. In some embodiments, destaging the one or more RUSH data stripes to the regular data stripes 1 through N of the RAID array may comprise filling holes in the regular data stripes using existing in-place update algorithms. If on the other hand, the amount of data stored in the RUSH data stripes is not greater than the predetermined threshold, the background destager threads may wait and the process ends at 710.

It is to be understood that for any methodologies described herein, e.g., window folding using RUSH data stripes, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems or for different RAID arrays or other data striping schemes on a particular storage system or systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a host device such as host device 102 or a storage controller such as storage controller 208 that is configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device or storage controller, a given such processing device may correspond to one or more virtual machines or other types of virtualization infrastructure such as Docker containers or Linux containers (LXCs). The host device 102 of system 100 or the storage controller 208 of system 200, as well as other system components, may be implemented at least in part using processing devices of such processing platforms. For example, in a distributed implementation of the storage controller 208, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate functionality for determining compression block size and selecting prime numbers and associated numbers of sub-stripes for efficient packing of compressed data as disclosed herein.

An illustrative embodiment of such a content addressable storage system will now be described with reference to FIG. 8. In this embodiment, a content addressable storage system 805 comprises a plurality of storage devices 806, an associated storage controller 808, and an associated cache 809. The content addressable storage system 805 may be viewed as a particular implementation of the storage system 205, and accordingly is assumed to be coupled to host devices 202 of computer system 201 via network 204 within information processing system 200.

The storage controller 808 in the present embodiment is configured to implement functionality for write folding using RUSH data stripes of the type previously described in conjunction with FIGS. 1 through 7.

The storage controller 808 includes RUSH logic 812, which is configured to operate in a manner similar to that described above for respective corresponding logic 112 and 212.

The cache 809 is configured to operate in a manner similar to that described above for respective cache 109 and 209.

Figure 8:
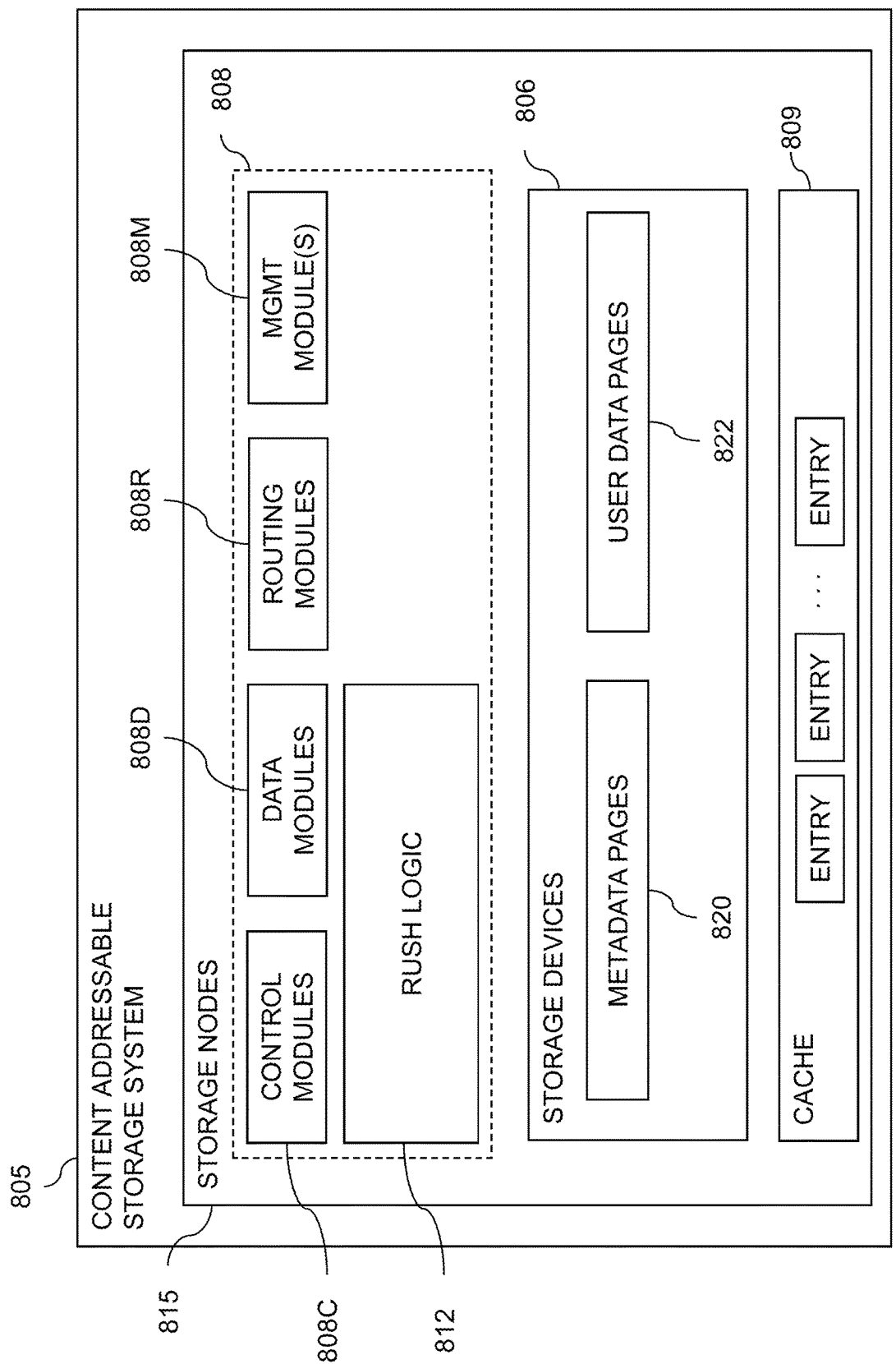
FIG. 8 shows a content addressable storage system having a distributed storage controller configured with functionality for performing write folding using RUSH data stripes in an illustrative embodiment.

The content addressable storage system 805 in the FIG. 8 embodiment is implemented as at least a portion of a clustered storage system and includes a plurality of storage nodes 815 each comprising a corresponding subset of the storage devices 806. Other clustered storage system arrangements comprising multiple storage nodes can be used in other embodiments. A given clustered storage system may include not only storage nodes 815 but also additional storage nodes coupled via a storage network. Alternatively, such additional storage nodes may be part of another clustered storage system of the system 200. Each of the storage nodes 815 of the storage system 805 is assumed to be implemented using at least one processing device comprising a processor coupled to a memory.

The storage controller 808 of the content addressable storage system 805 is implemented in a distributed manner so as to comprise a plurality of distributed storage controller components implemented on respective ones of the storage nodes 815. The storage controller 808 is therefore an example of what is more generally referred to herein as a "distributed storage controller." In subsequent description herein, the storage controller 808 may be more particularly referred to as a distributed storage controller.

Each of the storage nodes 815 in this embodiment further comprises a set of processing modules configured to communicate over one or more networks with corresponding sets of processing modules on other ones of the storage nodes 815. The sets of processing modules of the storage nodes 815 collectively comprise at least a portion of the distributed storage controller 808 of the content addressable storage system 805.

The modules of the distributed storage controller 808 in the present embodiment more particularly comprise different sets of processing modules implemented on each of the storage nodes 815. The set of processing modules of each of the storage nodes 815 comprises at least a control module 808C, a data module 808D and a routing module 808R. The distributed storage controller 808 further comprises one or more management ("MGMT") modules 808M. For example, only a single one of the storage nodes 815 may include a management module 808M. It is also possible that management modules 808M may be implemented on each of at least a subset of the storage nodes 815.

Each of the storage nodes 815 of the storage system 805 therefore comprises a set of processing modules configured to communicate over one or more networks with corresponding sets of processing modules on other ones of the storage nodes. A given such set of processing modules implemented on a particular storage node illustratively includes at least one control module 808C, at least one data module 808D and at least one routing module 808R, and possibly a management module 808M. These sets of processing modules of the storage nodes collectively comprise at least a portion of the distributed storage controller 808.

Communication links may be established between the various processing modules of the distributed storage controller 808 using well-known communication protocols such as IP, Transmission Control Protocol (TCP), and remote direct memory access (RDMA). For example, respective sets of IP links used in data transfer and corresponding messaging could be associated with respective different ones of the routing modules 808R.

Although shown as a separate logic of the distributed storage controller 808, the RUSH logic 812 in the present embodiment is assumed to be distributed at least in part over at least a subset of the other modules 808C, 808D, 808R and 808M of the storage controller 808.

Accordingly, at least portions of the functionality of the RUSH logic 812 may be implemented in one or more of the other modules of the storage controller 808. In other embodiments, the RUSH logic 812 may be implemented as a stand-alone module of the storage controller 808.

The storage devices 806 are configured to store metadata pages 820 and user data pages 822 and may also store additional information not explicitly shown such as checkpoints and write journals. The metadata pages 820 and the user data pages 822 are illustratively stored in respective designated metadata and user data areas of the storage devices 806. Accordingly, metadata pages 820 and user data pages 822 may be viewed as corresponding to respective designated metadata and user data areas of the storage devices 806.

A given "page" as the term is broadly used herein should not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 820 and the user data pages 822.

The user data pages 822 are part of a plurality of logical units (LUNs) configured to store files, blocks, objects or other arrangements of data, each also generally referred to herein as a "data item," on behalf of users associated with host devices 202. Each such LUN may comprise particular ones of the above-noted pages of the user data area. The user data stored in the user data pages 822 can include any type of user data that may be utilized in the system 200. The term "user data" herein is therefore also intended to be broadly construed.

The content addressable storage system 805 in the embodiment of FIG. 8 is configured to generate hash metadata providing a mapping between content-based digests of respective ones of the user data pages 822 and corresponding physical locations of those pages in the user data area. Content-based digests generated using hash functions are also referred to herein as "hash digests." The hash metadata generated by the content addressable storage system 805 is illustratively stored as metadata pages 820 in the metadata area. The generation and storage of the hash metadata is assumed to be performed under the control of the storage controller 808.

Each of the metadata pages 820 characterizes a plurality of the user data pages 822. For example, a given set of user data pages representing a portion of the user data pages 822 illustratively comprises a plurality of user data pages denoted User Data Page 1, User Data Page 2, . . . User Data Page n. It should be noted that usage of the variable n in this user data page context is unrelated to its usage elsewhere herein.

Each of the user data pages 822 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 806.

Each of the metadata pages 820 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 820 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 805 is illustratively distributed among the control modules 808C.

The functionality provided by RUSH logic 812 in this embodiment is assumed to be distributed across multiple distributed processing modules, including at least a subset of the processing modules 808C, 808D, 808R and 808M of the distributed storage controller 808.

For example, the management module 808M of the storage controller 808 may include logic that engages corresponding logic instances in all of the control modules 808C and routing modules 808R in order to implement processes for write folding using RUSH data stripes.

In some embodiments, the content addressable storage system 805 comprises an XtremIO™ storage array suitably modified to incorporate techniques for write folding using RUSH data stripes as disclosed herein.

In arrangements of this type, the control modules 808C, data modules 808D and routing modules 808R of the distributed storage controller 808 illustratively comprise respective C-modules, D-modules and R-modules of the XtremIO™ storage array. The one or more management modules 808M of the distributed storage controller 808 in such arrangements illustratively comprise a system-wide management module ("SYM module") of the XtremIO™ storage array, although other types and arrangements of system-wide management modules can be used in other embodiments. Accordingly, functionality for write folding using RUSH data stripes in some embodiments is implemented under the control of at least one system-wide management module of the distributed storage controller 808, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 824 slices distributed evenly across the C-modules, and there are a total of 16 C-modules in a given implementation, each of the C-modules "owns" 1024/16=64 slices. In such arrangements, different ones of the slices are assigned to different ones of the control modules 808C such that control of the slices within the storage controller 808 of the storage system 805 is substantially evenly distributed over the control modules 808C of the storage controller 808.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 805 each illustratively comprise one or more IO operations directing that at least one data item of the storage system 805 be written to in a particular manner. A given write request is illustratively received in the storage system 805 from a host device, illustratively one of the host devices 202. In some embodiments, a write request is received in the distributed storage controller 808 of the storage system 805 and directed from one processing module to another processing module of the distributed storage controller 808. For example, a received write request may be directed from a routing module 808R of the distributed storage controller 808 to a particular control module 808C of the distributed storage controller 808. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 815 communicate with one another over a high-speed internal network such as an InfiniBand network. The C-modules, D-modules and R-modules coordinate with one another to accomplish various IO processing tasks.

The write requests from the host devices identify particular data pages to be written in the storage system 805 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 805 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 805.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 806. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 805 correspond to respective physical blocks of a physical layer of the storage system 805. The user data pages of the logical layer are organized by LBA and have reference via respective content-based signatures to particular physical blocks of the physical layer.

Each of the physical blocks has an associated reference count that is maintained within the storage system 805. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 808C, 808D, 808R and 808M as shown in the FIG. 8 embodiment is presented by way of example only. Numerous alternative arrangements of processing modules of a distributed storage controller may be used to implement functionality for determining compression block size and selecting prime numbers and associated numbers of sub-stripes for efficient packing of compressed data in a clustered storage system in other embodiments.

Additional examples of content addressable storage functionality implemented in some embodiments by control modules 808C, data modules 808D, routing modules 808R and management module(s) 808M of distributed storage controller 808 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of host devices or storage systems with functionality for write folding using RUSH data stripes can provide a number of significant advantages relative to conventional arrangements. For example, some embodiments provide techniques for write folding using RUSH data stripes that reduce re-writes and thus cell wear in the storage system.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for write folding using RUSH data stripes will now be described in greater detail with reference to FIGS. 9 and 10. Although described in the context of system 100, these platforms may also be used to implement at least portions of other information processing systems in other embodiments.

Figure 9:
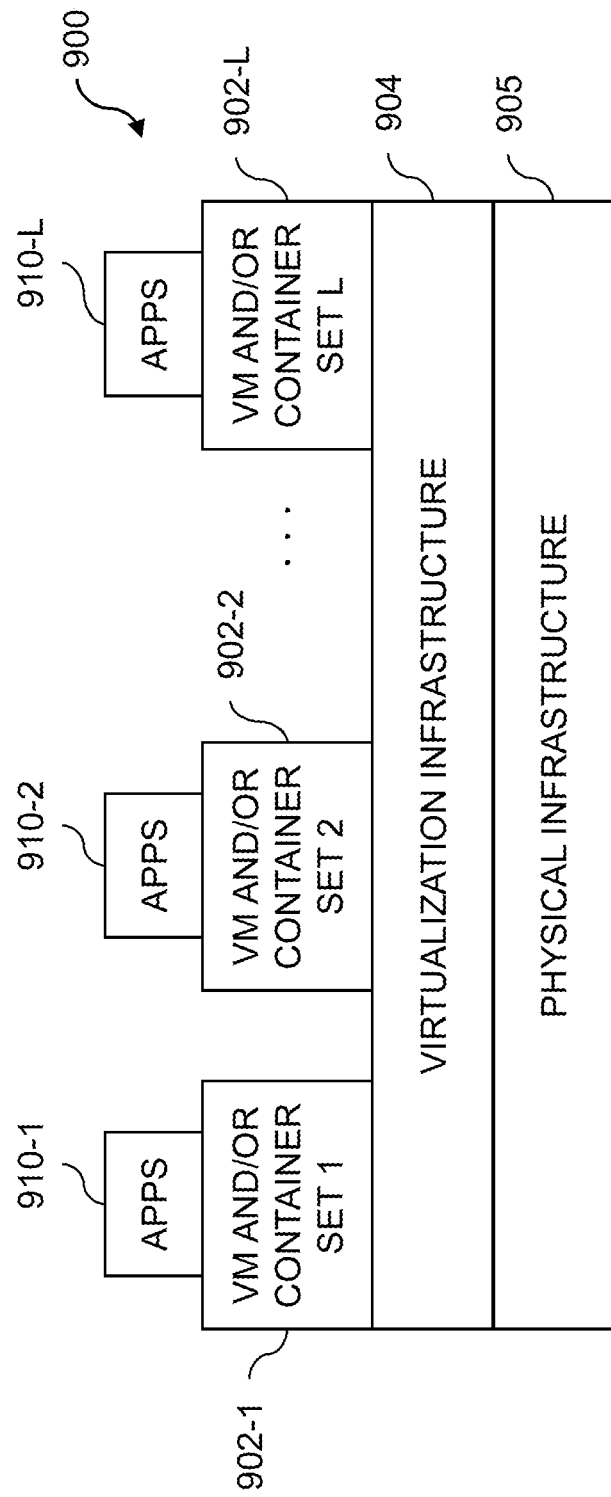
FIGS. 9 and 10 show examples of processing platforms that may be utilized to implement at least a portion of an information processing system in illustrative embodiments.
Figure 10:
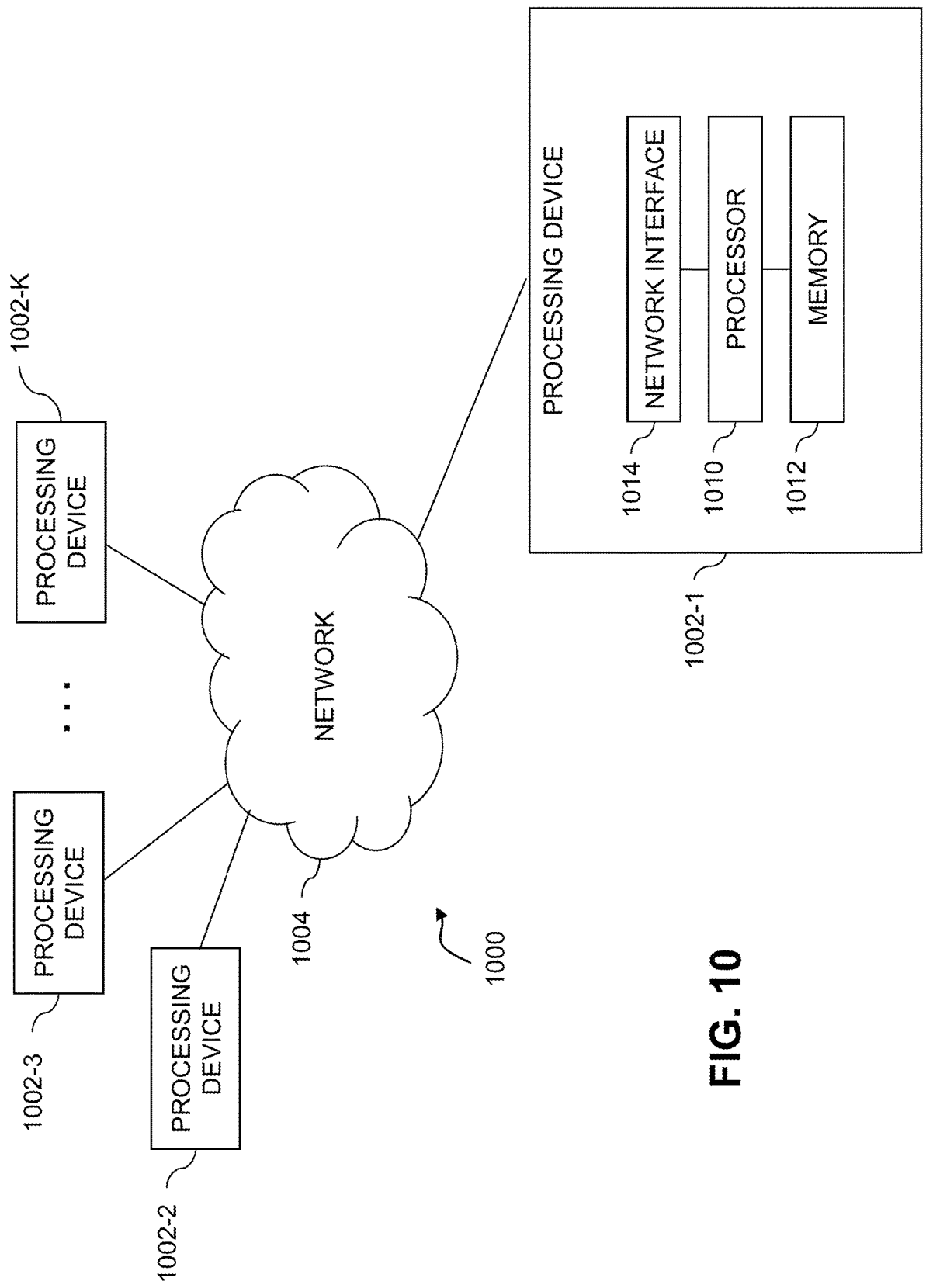

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide functionality for write folding using RUSH data stripes of the type described above for one or more processes running on a given one of the VMs. For example, each of the VMs can implement such functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide functionality for write folding using RUSH data stripes of the type described above for one or more processes running on different ones of the containers. For example, a container host device supporting multiple containers of one or more container sets can implement one or more instances of such functionality or logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 or 200 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 or 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for determining compression block size and selecting prime numbers and associated numbers of sub-stripes for efficient packing of compressed data as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, RAID arrays or other data striping, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system implementing data striping, the storage system comprising:
a cache;
a plurality of storage devices that are configured to store data blocks, the data blocks being distributed across the plurality of storage devices in a plurality of data stripes, the plurality of data stripes comprising:
a first set of data stripes; and
a second set of data stripes, the first set of data stripes being configured to implement write folding of data to be stored in the second set of data stripes; and
a storage controller associated with the cache and the plurality of storage devices, the storage controller being configured:
to receive data associated with at least one input-output request from the cache;
to store the received data sequentially in at least one data stripe of the first set of data stripes;
to determine whether or not an amount of data stored in the first set of data stripes is greater than a threshold amount of data; and
in response to determining that the amount of data stored in the first set of data stripes is greater than the threshold amount of data, to destage the at least one data stripe of the first set of data stripes to the second set of data stripes.

2. The apparatus of claim 1, wherein at least one data block of each data stripe of the first set of data stripes is configured to store a metadata page, the metadata page of a given data stripe of the first set of data stripes comprising information corresponding to data entries stored in the data blocks of the given data stripe of the first set of data stripes.

3. The apparatus of claim 2, wherein the metadata page of the given data stripe of the first set of data stripes comprises a signature and a reference count for each data entry stored in the given data stripe of the first set of data stripes.

4. The apparatus of claim 3, wherein storing the received data sequentially in the at least one data stripe of the first set of data stripes comprises compressing the received data and storing the compressed data in the at least one data stripe of the first set of data stripes.

5. The apparatus of claim 4, wherein the metadata page of the given data stripe of the first set of data stripes comprises a packing bitmap comprising information on a compression ratio of each data entry in the given data stripe of the first set of data stripes.

6. The apparatus of claim 2, wherein in storing the received data sequentially in the at least one data stripe of the first set of data stripes, the storage controller is further configured:
to determine whether or not the received data includes data targeted for storage at the same data block of the second set of data stripes as data stored in another data block of the first set of data stripes; and
in response to determining that the received data includes data targeted for storage at the same data block of the second set of data stripes as the data stored in the another block of the first set of data stripes, updating the metadata page of the data stripe of the first set of data stripes comprising the another data block to invalidate the data stored in the another data block,
wherein the invalidated data is not destaged to the second set of data stripes.

7. The apparatus of claim 1, wherein the storage controller is further configured to allocate a predetermined number of the plurality of data stripes as the first set of data stripes.

8. The apparatus of claim 7, wherein the storage controller is configured to determine the predetermined number based at least in part on a target size for the first set of data stripes.

9. The apparatus of claim 7, wherein the storage controller is configured to determine the predetermined number based at least in part on a writing speed of the storage system such that the first set of data stripes comprises sufficient size to hold data associated with incoming IO requests for a target period of time before destaging the at least one of the first set of data stripes to the second set of data stripes.

10. The apparatus of claim 1, wherein receiving the data from the cache and storing the received data sequentially in the at least one data stripe comprises:
determining that an amount of data stored in the cache is greater than a second threshold amount of data; and
destaging the data from the cache into the at least one data stripe of the first set of data stripes based at least in part on the determination that the amount of data stored in the cache is greater than the second threshold amount of data.

11. The apparatus of claim 1, wherein the plurality of storage devices comprise non-volatile memory express (NVMe) drives, the first set of data stripes comprising a separate NVMe stream for each drive.

12. A method comprising:
receiving data associated with at least one input-output request from a cache of a storage system, the storage system comprising a plurality of storage devices configured to store data blocks, the data blocks being distributed across the plurality of storage devices in a plurality of data stripes, the plurality of data stripes comprising a first set of data stripes and a second set of data stripes, the first set of data stripes being configured to implement write folding of data to be stored in the second set of data stripes;
storing the received data sequentially in at least one data stripe of the first set of data stripes;
determining whether or not an amount of data stored in the first set of data stripes is greater than a threshold amount of data; and
in response to determining that the amount of data stored in the first set of data stripes is greater than the threshold amount of data, destaging the at least one data stripe of the first set of data stripes to the second set of data stripes;
wherein the method is performed by a storage controller of the storage system, the storage controller comprising at least one processor coupled to memory.

13. The method of claim 12, wherein at least one data block of each of the first set of data stripes is configured to store a metadata page, the metadata page of a given data stripe of the first set of data stripes comprising information corresponding to data entries stored in the data blocks of the given data stripe of the first set of data stripes.

14. The method of claim 13, wherein the metadata page of the given data stripe of the first set of data stripes comprises a signature and a reference count for each data entry stored in the given data stripe of the first set of data stripes.

15. The method of claim 14, wherein storing the received data sequentially in the at least one data stripe of the first set of data stripes comprises compressing the received data and storing the compressed data in the at least one data stripe of the first set of data stripes.

16. The method of claim 15, wherein the metadata page of the given data stripe of the first set of data stripes comprises a packing bitmap comprising information on a compression ratio of each data entry in the given data stripe of the first set of data stripes.

17. The method of claim 13, wherein in storing the received data sequentially in the at least one data stripe of the first set of data stripes, the method comprises:
determining whether or not the received data includes data targeted for storage at the same data block of the second set of data stripes as data stored in another data block of the first set of data stripes; and
in response to determining that the received data includes data targeted for storage at the same data block of the second set of data stripes as the data stored in the another block of the first set of data stripes, updating the metadata page of the data stripe of the first set of data stripes comprising the another data block to invalidate the data stored in the another data block,
wherein the invalidated data is not destaged to the second set of data stripes.

18. The method of claim 12, wherein receiving the data from the cache and storing the received data sequentially in the at least one data stripe comprises:
determining that an amount of data stored in the cache is greater than a second threshold amount of data; and
destaging the data from the cache into the at least one data stripe of the first set of data stripes based at least in part on the determination that the amount of data stored in the cache is greater than the second threshold amount of data.

19. The method of claim 12, wherein the plurality of storage devices comprise non-volatile memory express (NVMe) drives, the first set of data stripes comprising a separate NVMe stream for each drive.

20. A computer program product comprising a non-transitory processor-readable storage medium having stored therein program code of one or more software programs, the program code being executable by at least one processing device of a storage system, the storage system comprising a cache and a plurality of storage devices configured to store data blocks, the data blocks being distributed across the plurality of storage devices in a plurality of data stripes, the plurality of data stripes comprising a first set of data stripes and a second set of data stripes, the first set of data stripes being configured to implement write folding of data to be stored in the second set of data stripes, wherein the program code, when executed by the at least one processing device, causes the at least one processing device:

to receive data associated with at least one input-output request from the cache;

to store the received data sequentially in at least one data stripe of the first set of data stripes;

to determine whether or not an amount of data stored in the first set of data stripes is greater than a threshold amount of data; and in response to determining that the amount of data stored in the first set of data stripes is greater than the threshold amount of data, to destage the at least one data stripe of the first set of data stripes to the second set of data stripes.

\* \* \* \* \*